United States Patent

Kim

[11] Patent Number: 5,278,486
[45] Date of Patent: Jan. 11, 1994

[54] METHOD OF OPERATING SLIP ANGULAR VELOCITY OF INDUCTION MOTOR

[75] Inventor: Dong-Il Kim, Seoul, Rep. of Korea

[73] Assignee: Samsung Electronics Co., Ltd., Suwon, Rep. of Korea

[21] Appl. No.: 929,389

[22] Filed: Aug. 14, 1992

[30] Foreign Application Priority Data

Aug. 17, 1991 [KR] Rep. of Korea ................ 91-14206

[51] Int. Cl.$^5$ .................................... H02D 05/40
[52] U.S. Cl. .................................... 318/811; 318/609; 318/806; 388/906
[58] Field of Search ............... 318/609, 610, 806, 805, 318/811, 808, 807, 803, 772, 768, 802, 810; 388/906

[56] References Cited

U.S. PATENT DOCUMENTS

| | | | |
|---|---|---|---|
| 4,023,083 | 5/1977 | Plankett | 318/810 |
| 4,215,305 | 7/1980 | D'Oatre et al. | 318/808 |
| 4,316,791 | 1/1982 | Akamatsu | 318/808 |
| 4,445,080 | 4/1984 | Curtiss | 318/806 |
| 4,456,868 | 6/1984 | Yamamura et al. | 318/800 |
| 4,469,997 | 9/1984 | Curtiss et al. | 318/805 |
| 4,617,675 | 10/1986 | Ashikaga et al. | 318/811 |
| 4,751,447 | 6/1988 | Okachi | 318/768 |
| 4,885,520 | 12/1989 | Sugimoto et al. | 318/808 |
| 5,136,228 | 8/1992 | Yamada et al. | 318/808 |

FOREIGN PATENT DOCUMENTS 57-180387 11/1982 Japan .

Primary Examiner—William M. Shoop, Jr.
Assistant Examiner—John W. Cabeca
Attorney, Agent, or Firm—Burns, Doane, Swecker & Mathis

[57] ABSTRACT

The present invention relates to an induction motor, and a method of adjusting slip angular velocity of an induction motor, based on the voltage, current and velocity of the induction motor and compensating the slip angular velocity using vector control of the induction motor by way of a current controllable inverter.

8 Claims, 4 Drawing Sheets

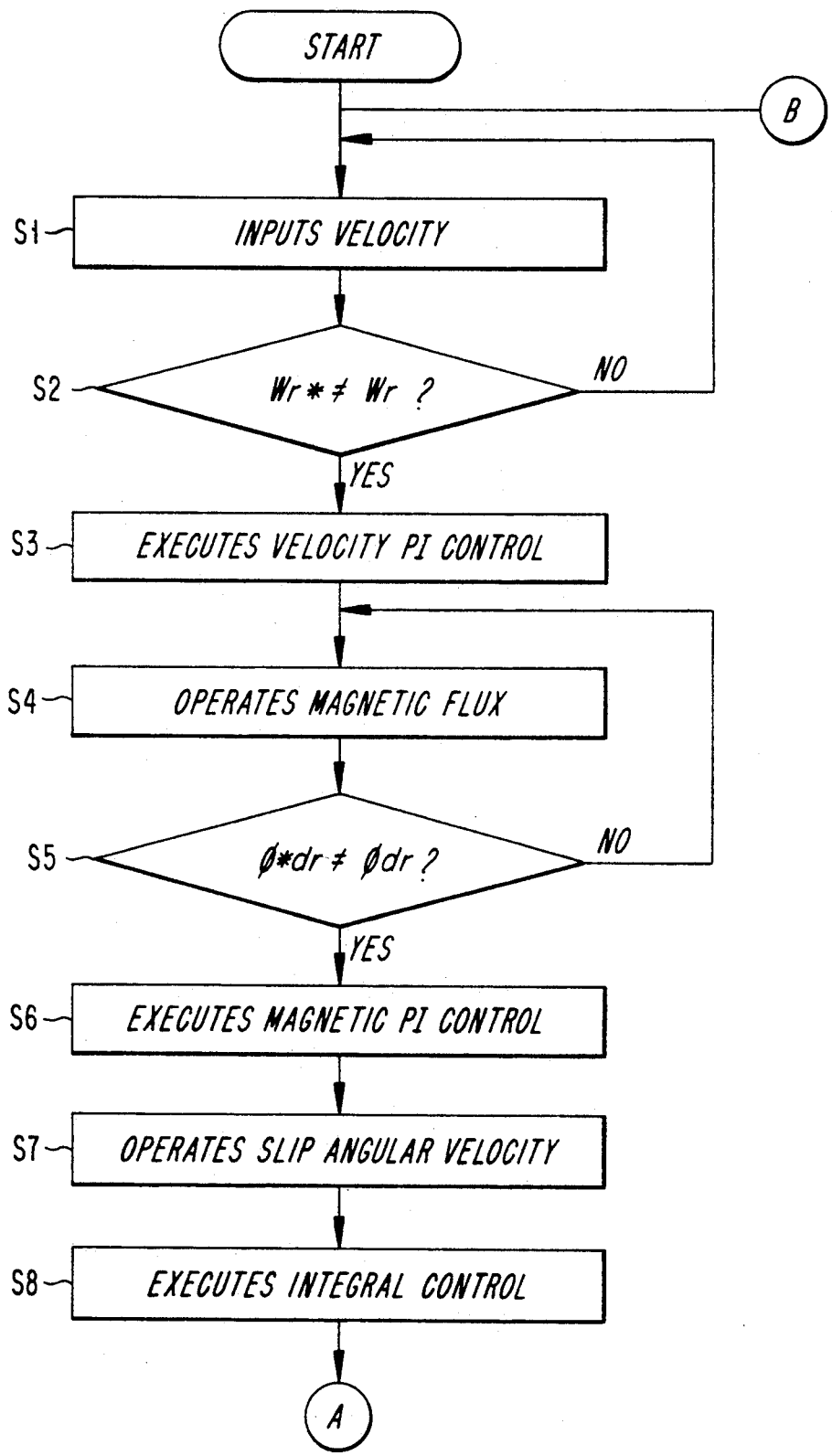

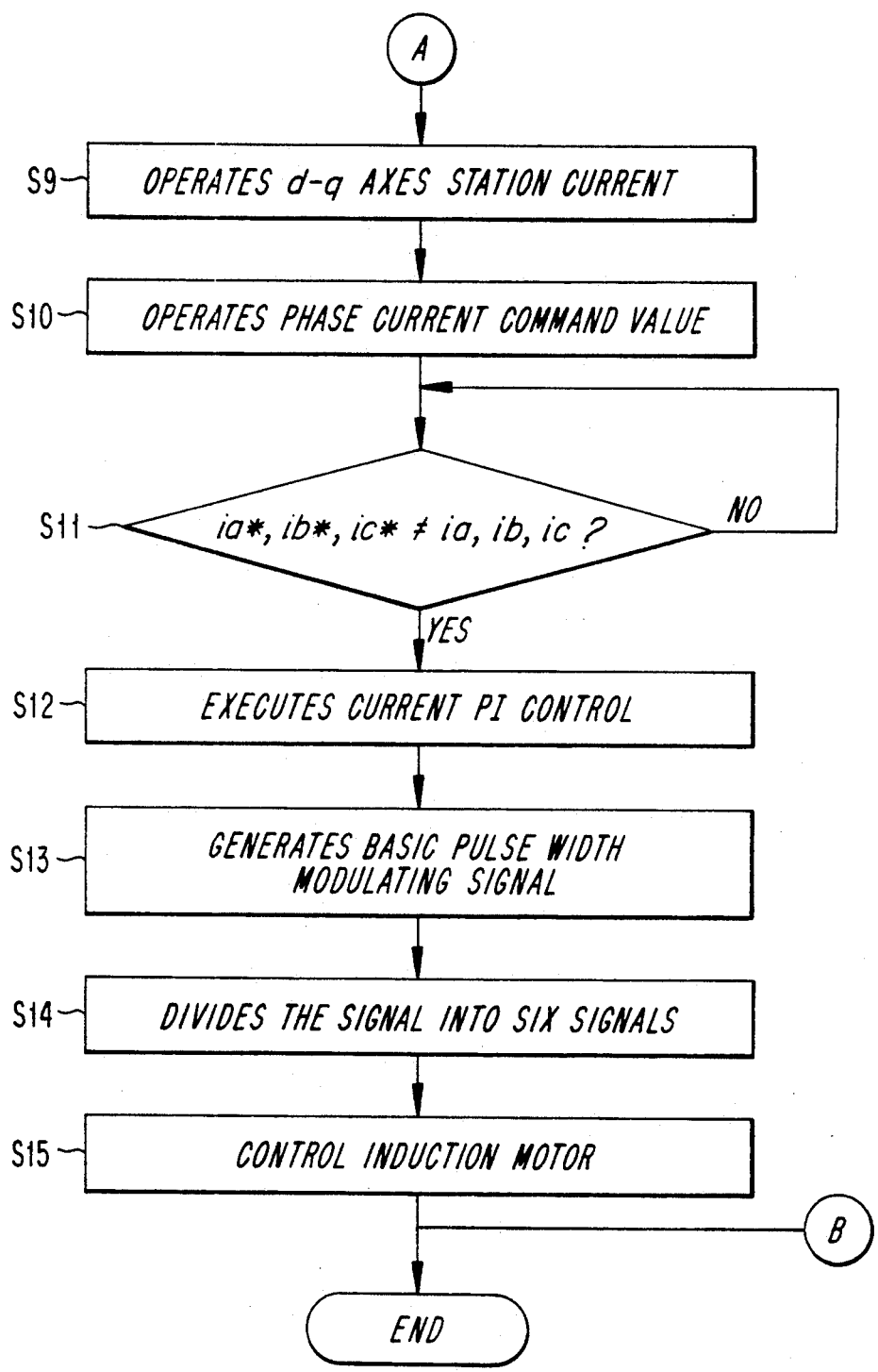

METHOD OF OPERATING SLIP ANGULAR VELOCITY OF INDUCTION MOTOR

BACKGROUND OF THE INVENTION

1. Field of the Invention

The present invention relates to an induction motor, more particularly, to a method of operating a slip angular velocity of an induction motor, on the basis of the voltage, current and velocity of the induction motor which compensates the slip angular velocity in case of vector control of the induction motor by a current controllable inverter.

2. Description of the Prior Art

In general, an induction motor is considered a typical brushless ac motor of which any one of a rotator and a stator is connected to a power voltage while the other is operated by way of an induced voltage.

For example, a velocity control device of such an induction motor is disclosed in Japanese Patent laid-open publication No. sho 57- 180387, which is shown in FIG. 1. More specifically, the device has a variable voltage and variable frequency control portion VVVF provided at the side of a power voltage of an induction motor IM, a velocity operation portion SOP for calculating a difference between a velocity signal NF of the rotational velocity of the induction motor IM and a velocity command signal NR, A current operation portion IOP obtains a current value of the induction motor IM on the basis of an effective current signal I2. An excitation current IO setting signal and the like outputted from the velocity operation portion SOP controls an output voltage of the variable voltage and variable frequency control portion VVVF. Also included is an adder ADD which adds the velocity signal NF and the effective current I2 outputted from the velocity operation portion SOP to control an output frequency of a voltage to frequency converter VFC which applies its output frequency to a frequency control portion FCT. A comparator CP feeds back a primary current IF signal to the velocity operation portion SOP in accordance with an output signal of a polarity detecting circuit PD when the primary current IF detected by a current transformer CT disposed at an output end of the variable voltage and variable frequency control portion VVVF and passed through a rectifier REC is above a predetermined set value. A differentical circuit DF differentiates the output of the adder ADD and feeds the differentiated value to the velocity operation portion SOP. An operation portion OP receives the primary current signal passed through the rectifier REC and the output signal of the current operation portion IOP and supplies the resultant value to a voltage control portion VCT which outputs a voltage control signal to the variable voltage and variable frequency control portion VVVF.

With the velocity control device of the induction motor described above, the motor is rotated with a predetermined slip according to the frequency of the power voltage. Particularly, when the velocity varies, for example when acceleration or deceleration occurs it is difficult to maintain the slip of the motor constant. Thus the rotational velocity of the motor is unstable. A vector control method needs to be adapted to overcome the variable slip and unstable rotational velocity of the motor which occurs due to the variation of the velocity. The method is needed to execute a slip angular velocity operation, so a slip value is obtained when the parameter, such as the resistance of the rotation variable according to the environs temperature is likely incorrect. The method overcomes the problem that normal efficiency of the induction motor cannot be assured.

SUMMARY OF THE INVENTION

Accordingly, an object of the present invention is to provide a method of operating slip angular velocity of an induction motor, which can cause slip on the basis of voltage, current and velocity of an induction motor to control the rotational velocity of the motor.

Another object of the present invention is directed to a method of operating the slip angular velocity of an induction motor, which can easily effect a slip angular operation of an induction motor using a microprocessor.

In order to achieve the objects, the present invention contemplates a method of operating slip angular velocity of an induction motor, comprising the steps of.

detecting a velocity error of the induction motor and executing a proportional-integral operation to the velocity error;

detecting a magnetic flux error of a rotator and executing a proportional-integration operation to the magnetic flux error; operating a slip angular velocity of the induction motor and integrating the slip angular velocity; and operating a current command value of a stator on d-q axes and producing phase current command values of the induction motor. Also included are the steps of detecting an error between the phase current command value and a three-phase current value of the induction motor and executing a proportional integral operation to the current; comparing a triangle wave and the proportional-integrated phase current to produce a basic pulse width modulation signal; demultiplexing the basic pulse width modulation signal; and, obtaining a rotational velocity of the induction motor by using the demultiplexed signal.

The method of operating the slip angular velocity of the induction motor according to the present invention can be applied to a field that needs vector control for the induction motor as well as a field in which accuracy vector control is impossible under a bad condition in which parameters of the induction motor are varied.

The above and other objects, features and advantages of the invention will be apparent from the following description taken with reference to the accompanying drawings.

DETAILED DESCRIPTION OF THE INVENTION

Hereinafter, a preferred embodiment of the present invention will be described in detail with reference to the accompanying drawings.

Figure 1:
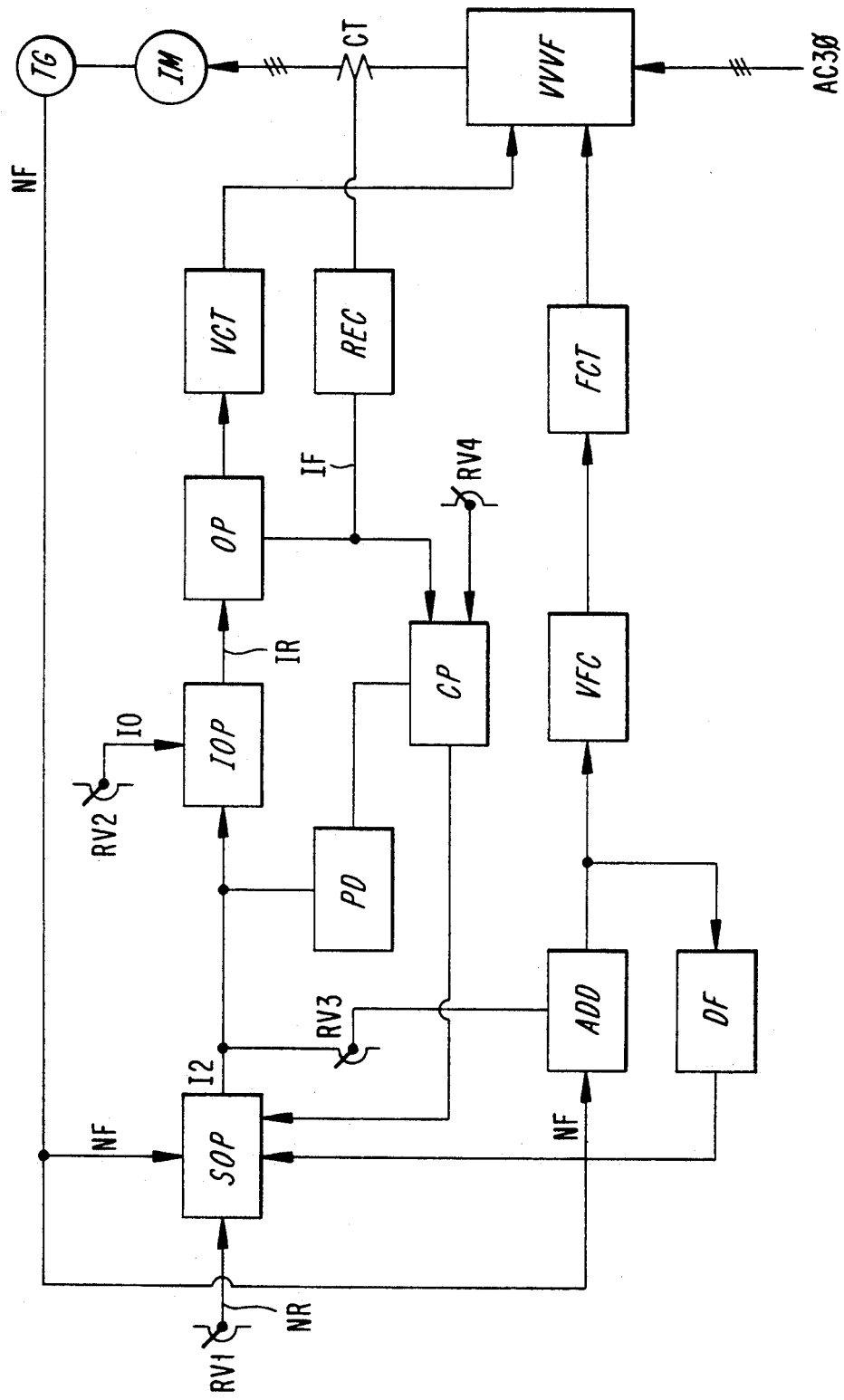
FIG. 1 is a schematic block diagram of a velocity control device of an induction motor according to a conventional example.
Figure 2:
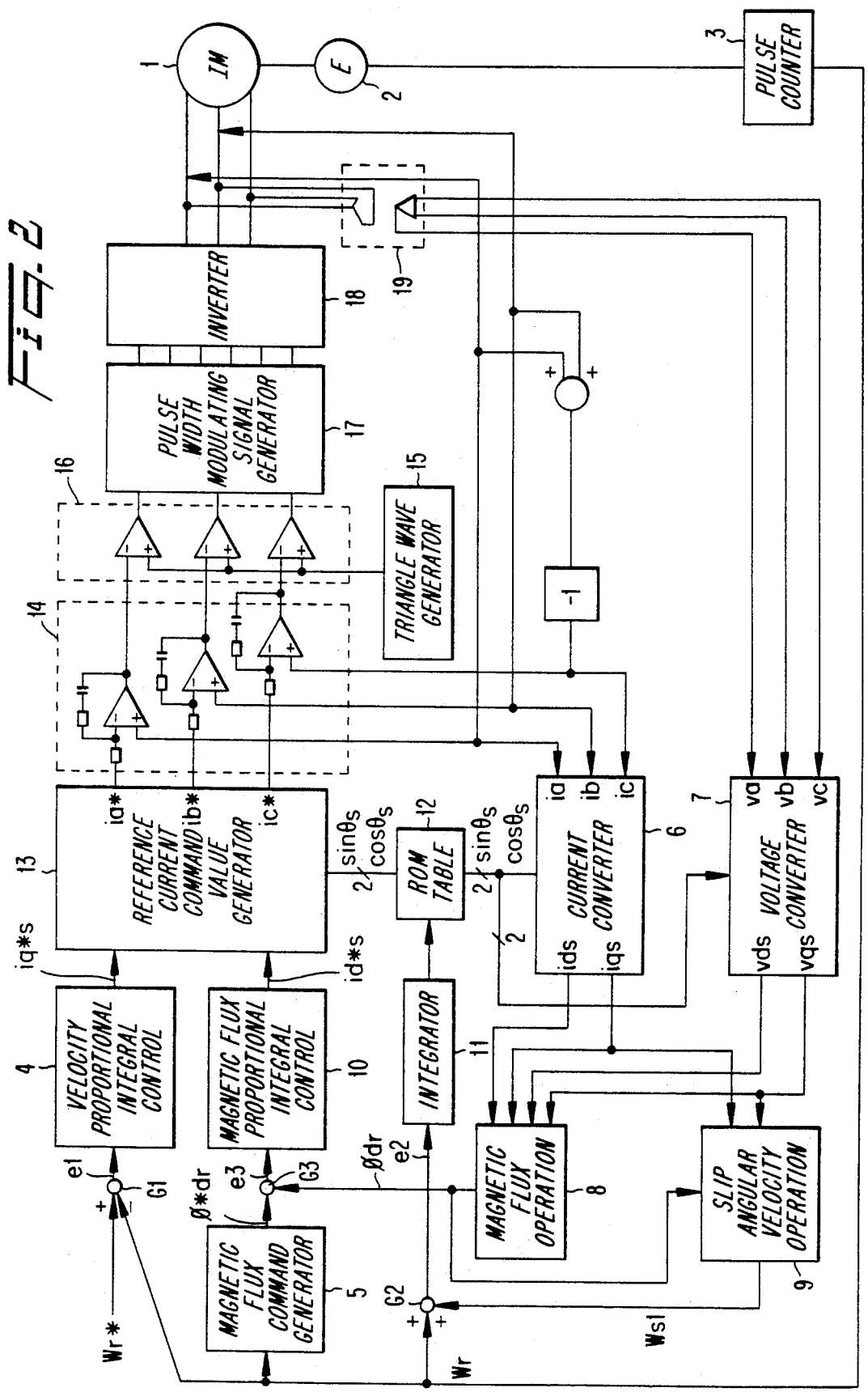
FIG. 2 is a block diagram of a slip angular velocity operation control device according to the present invention; and, FIGS. 3A and 3B comprise is a flowchart illustrating a method of operating the slip angular velocity of the induction motor according to the present invention.

FIG. 2 is a block diagram of a slip angular velocity operaton control device of an induction motor employed in the present invention and FIGS. 3A and 3B comprise is a flowchart illustrating a slip angular velocity operation method for an induction motor according to the present invention.

Referring to FIG. 2, 1 denotes the induction motor IM, 2 denotes an encoder E which detects the present velocity of the induction motor 1 and produces pulse waveforms corresponding to the present velocity. Reference numeral 3 denotes a pulse counter which counts the number of pulse waveforms produced by the encoder 2.

Reference numeral 4 denotes a velocity proportional-integral(PI) control portion which proportionally ingrates an error e1 obtained by comparing a normal velocity command value Wr* of a rotator and a present velocity value Wr of the rotator inputted from the pulse counter 3. Reference numeral 5 denotes a magnetic flux command value generator which generates a magnetic flux command value according to the velocity of the induction motor 1 and has the field weakening function that enables the induction motor to be driven at a velocity higher than a rated velocity thereof. Reference numeral 6 denotes a current converter which converts three-phase currents ia, ib and ic on three axes secured to a stator into currents ids and iqs on a d-q axes to be rotated.

Reference numeral 7 denotes a voltage converter which converts three-phase voltages Va, Vb and Vc on the three axes secured to the stator into voltages Vds and Vqs on the d-q axes to be rotated. Reference numeral 8 denotes a magnetic flux operation portion which operates a magnetic flux $\phi dr$ by using the currents ids and iqs on the d-q axes converted by the current converter 6 and the voltage Vds and Vqs on the d-q axes converted by the voltage converter 7. Reference numeral 9 denotes a slip angular velocity operation portion which operates a slip angular velocity Ws1 of the induction motor 1 by using the current iqs and the voltage Vqs on the q-axes converted by the current converter 6 and, the voltage converter 7, the rotator flux $\phi dr$ operated by the magnetic flux operation porton 8.

Reference numeral 10 denotes a magnetic flux proportional integral control portion which proportionally integrates an error obtained by comparing the d-axis normal magnetic flux command value $\phi^*dr$ generated by the magnetic flux command value generator 5 and the present d-axis magnetic flux value $\phi dr$ of the rotator operated by the magnetic flux operation portion 8. Reference numeral 11 denotes an integrator which integrates a synchronous angular velocity Ws obtained by adding the present velocity value Wr of the induction motor 1, counted by the pulse counter 3 and the slip angular velocity Ws1 of the induction motor 1 operated by the slip angular velocity operation portion 9. Reference numeral 12 denotes a ROM table which stores sine and cosine values for converting a physical amount of the d-q axes into a physical amount related relating the three axes secured to the stator or executing a function opposed to the aforementioned conversion function.

Reference numeral 13 denotes a reference current command value generator which generates the current command values ia* id* and ic* for each phase a, b or c of the induction motor 1 by using the q-axis current value iq* s and the d-axis current value id* s inputted from the velocity proportional integral control portion 4 and the magnetic flux proportional integral control portion 10. The reference current command value generator 13 has a coordinate transform function for coordinating the d-q axes current command values id* s and iq* s into the current command values ia*, ib* and ic* for the three axes a, b and c secured to a stator shaft(not shown).

Reference numeral 14 denotes a current proportional integral controller which proportionally integrates an error generated by comparing the three-phase current command values ia*, ib* and ic* produced from the reference current command value generator 13 and the present three-phase current values ia, ib and ic detected by a half sensor (not shown). Reference numeral 15 denotes a triangle-wave generator which obtains a triangle-wave. Reference numeral 16 denotes a comparator which compares the input value from the current proportional integral controller 14 and the input value from the triangle-wave generator 15.

Reference numeral 17 denotes a pulse width modulation signal generator which obtains a basic pulse width modulation signal on the basis of the compared output value from the comparator 16. Reference numeral 18 denotes an inverter which receives the six divided pulse width modulation signals and controls the induction motor 1. The inverter comprises a three-phase half-bridge including six power transistors, MOSFET or IGBT and generates a voltage for dividing the induction motor 1. Reference numeral 19 denotes a voltage detecting pulse converter which detects the the voltage supplied from the inverter 18 to the induction motor 1.

Now, the slip operation method using the slip angular velocity operation device of the induction motor as constructed above will be described in detail.

Motion equations of the induction motor 1 on the d-q axes rotating with an arbitrary synchronous angular velocity Ws can be expressed as below.
That is;

$$Vqs = Rs\ iqs + Ws\ \phi ds + d/dt.\phi qs$$

$$Vds = Rs\ ids - Ws\ \phi qs + d/dt.\phi ds$$

$$O = Rr\ iqr + (Ws - Wr)\phi dr + d/dt.\phi qr$$

$$O = Rr\ idr - (Ws - Wr)\phi qr + d/dt.\phi dr \quad (1)$$

where, Vqs denotes the q-axis stator voltage, Vds denotes the d-axis stator voltage, iqs denotes the q-axis stator current, ids denotes the d-axis stator current, $\phi qs$ denotes the q-axis stator magnetic flux, $\phi dr$ denotes the q-axis rotator magnetic flux, qr denotes the d-axes rotator magnetic flux, $\phi Ws$ denotes the synchronous angular velocity, Wr denotes the rotator velocity, Rs denotes the stator resistance and Rr denotes the rotator resistance. The synchronous angular velocity Ws is generally controlled as below in case of the vector control.

$$Ws = Wr + Lm\ Rr/Lr \times iqs/\phi dr \quad (2)$$

where, Lm denotes a mutual inductance of the rotator and stator and Lr denotes an inductance of the rotator.

More specifically, a second term of the equation (2) indicates the slip angular velocity Ws1 which can be expressed when it is operated from the first equation of the equation (1). That is;

$$Ws1 = Vqs/iqs\ Rs - d(\phi qs/\phi ds)/dt - Wr \quad (3)$$

where, the q-axis stator voltage Vqs is operated on the basis of the voltage detected by the voltage detecting pulse converter 19. The rotator velocity Wr is operated on the basis of the output pulse of the encoder 2 detecting the velocity of the induction motor 1. The q-axis stator current iqs is detected by means of a hall sensor (not shown). Also, the d-axis stator magnetic flux $\phi$ds is operated according to $\phi$ds = Ls ids + Lm idr (where, Ls denotes an inductance of the stator).

The d-axis rotator current idr is set to be zero in case of the vector control, so the practical d-axis stator magnetic flux $\phi$ds can be expressed as an equation, that is, $\phi$ds = Ls ids.

In the equation (3), the term d $\phi$qs/dt is present only when the magnetic flux is changed significantly in a moment. Accordingly, if sampling time dt is short in an operation, of a microprocessor, the term d$\phi$qs/dt is zero and thus, the slip angular velocity Ws1 can be accurately operated by the following equation. That is:

$$Ws1 = Vqs - iqsRs/\phi ds - Wr \qquad (4)$$

As described above, in the slip angular velocity operation of the induction motor 1, the stator resistance Rs having relatively small amount in variation is used instead of the rotor resistance Rr, so that the slip angular velocity Ws1 can be operated accurately in relation to the variation of the temperature and/or magnetic flux.

Now, the description related to FIG. 2 will be made referring to FIGS. 3A and 3B.

According to a first step in FIG. 3A, the normal velocity command value Wr* of the rotator of the induction motor 1 is input, while the present value of the induction motor 1 detected by the encoder 2 is generated as a pulse wave. The number of pulses in the pulse wave is then counted by the pulse counter 3 in order to obtain the present velocity value Wr. Next, at a step S2 the adder G1 compares the normal velocity command value Wr* and the present velocity value Wr of the induction motor 1. If the velocity error is present (Yes, Wr*≠Wr) control proceeds to step S3 at which the velocity error e1 is input to the velocity proportional integral control portion 4 in order to execute the proportional integral control.

On the contrary, if the velocity error is not present at the step S2 (No, Wr*=Wr), then the velocity error detection is continuously carried out.

Consequently, at a step S4, the magnetic flux operation portion 8 operates the d-axis rotator magnetic flux $\phi$dr by using the d-q axes stator currents ids and *iqs operated on the basis of the three phase currents ia, ib and ic (ic is obtained on the basis of phase currents ia and ib) and the d-q axes stator voltages Vds and Vqs operated on the basis of the three phase voltages Va, vb and Vc of the induction motor 1 detected by the pulse converter 19.

Thereafter, at a step S5, the adder G3 compares the d-axis rotator magnetic flux $\phi$*dr generated by the magnetic flux command value generator 5 with the d-axis rotator magnetic flux $\phi$dr operated by the magnetic flux operation portion 8.

When a magnetic flux error is generated (that is, Yes, $\phi$*dr = $\phi$dr, control proceeds to a step S6 at which the magnetic error is input to the magnetic flux proportional integral control portion 10 to execute the proportional integral control.

Sequentially, at a step S7 the slip angular velocity operation portion 9 receives the q-axis stator current iqs converted by the current converter 6 and the q-axis stator voltage Vqs and operates the slip angular velocity Ws1 of the induction motor 1 by using the equation 4. Next, at a step S8 the adder adds the present velocity value Wr and the slip angular velocity Ws1 and the added result is integrated by the integrator 11 and input to the ROM table 12. The velocity and magnetic flux obtained at the steps S3 and S6 are proportionally integrated to operate the q-axis stator current (iq*s) and the d-axis stator current id*s, at a step S9. The operation result is input to the reference current command generating portion 13. At a step S10, the reference current command generating portion 13 receives the sine and cosine values produced on the basis of the synchronous angular velocity Ws in the ROM table 12 and generates the phase current command values ia*, ib*, and ic* which are compared with the three-phase currents ia, ib and ic detected by the hall sensor at a step S11. At the step S11, if an error value is present (that is ia*, ib*, ic* = ia, ib, ic), then the control is preceded to a step s12, at which the error value is input to the current proportional-integral controller 14 which proportionally and integrally controls error value. Thereinafter, control proceeds to a step S13 in order to compare the control output value of the current proportional integral controller 14 input to an inverting input terminal (−) of the comparator 16 and the triangle wave inputted from the triangle wave generator 15 to a noninverting input terminal (+) of the comparator 16.

Accordingly, at the step S13, the comparison result value of the comparator 16 is input to the pulse width modulation signal generator 17 to obtain the basic pulse width modulating signal at a step S14 the pulse width modulating signal is divided into six signals. Then the divided six pulse width signals are supplied to the inverter 18 at a step S15.

To this end, the inverter 18 produces the three phase voltages Va, Vb and Vc to be inputted to the induction motor 1 to obtain the three phase currents ia, ib and ic induced from the voltages Va, Vb and Vc, which in turn are inputted to the induction motor 1 in order to control the drive of the motor 1.

The six pulse width modulating signal produced by the pulse width modulating signal generator 17 at the step S14 can be used to drive six power switch elements comprising the inverter 18, and the power switch elements formed with the three phase half-wave bridge including power transistors, MOS-FETs, IGBTs or the like.

Although the present invention has been described with reference to a preferred embodiment thereof, it is not limited to the embodiment and many changes and modifications can be made without departing from the spirit and scope of the invention.

As described above, according to the method of operating the slip angular velocity of the present invention, the microprocessor is employed to operate the slip amount of the induction motor by a simple operation method depending upon the voltage, current, and velocity of the motor. The slip amount of the motor is compensated for to adequately control the drive of the motor. Accordingly, the rotational velocity of the induction motor can be appropriately controlled and the operation can be carried out easily.

What is claimed is:

1. A method of operating a slip angular velocity of an induction motor, comprising the steps of:

determining a velocity error of the induction motor and executing a proportional integral operation to the velocity error;

determining a magnetic flux error of a rotator of the induction motor using feedback and executing a proportional integral operation to the magnetic flux error;

generating a slip angular velocity based on a stator current for the induction motor and integrating the slip angular velocity;

generating a current command value of a stator of the induction motor and a phase current command value for the induction motor;

determining a current error between the phase current command value and a three-phase current value of the induction motor and executing a proportional integral operation on the current error;

comparing a triangle wave and the proportionally integrated current error to produce a basic pulse width modulation signal;

demultiplexing the basic pulse width modulation signal to produce a demultiplexed signal; and obtaining a rotational velocity of the induction motor from the demultiplexed signal.

2. The method according to claim 1, wherein the velocity error determining step further comprises the step of:

comparing a normal velocity command value of the induction motor with a present velocity value of the induction motor to determine the velocity error.

3. The method according to claim 1, wherein the magnetic flux error determining step further comprises the step of:

comparing a normal magnetic flux command value with a present magnetic flux operated on a q-axis stator current and a q-axis stator voltage to determine the magnetic flux error.

4. The method according to claim 1, wherein step of generating the slip angular velocity further comprises the step of:

generating the slip angular velocity based on a stator current, a stator voltage, and a rotator magnetic flux.

5. The method according to claim 1, wherein the step of integrating the slip angular velocity further comprises the step of:

storing an integrated output value in a ROM table.

6. The method according to claim 1, wherein the phase current command value generated is based on a first stator current obtained by velocity proportional-integral control and a second stator current obtained by magnetic flux proportional-integral control.

7. The method according to claim 5, wherein the integrated output value in the ROM table is input into a reference current command value generator to obtain a reference current command value.

8. The method of claim 1, wherein the step of determining a magnetic flux error further comprises the steps of:

measuring line voltages of the induction motor using a pulse transformer, transforming the measured values into voltages Vds and Vqs, and using the voltages Vds and Vqs to determine the magnetic flux error.

* * * * *